March 5, 1968 A. SIMMON 3,371,575
ILLUMINATING APPARATUS FOR PHOTOGRAPHIC
ENLARGERS PROVIDED WITH INTERCHANGEABLE
INTEGRATING BODIES Filed April 12, 1965 3 Sheets-Sheet 1

INVENTOR
ALFRED SIMMON
BY
ATTORNEY

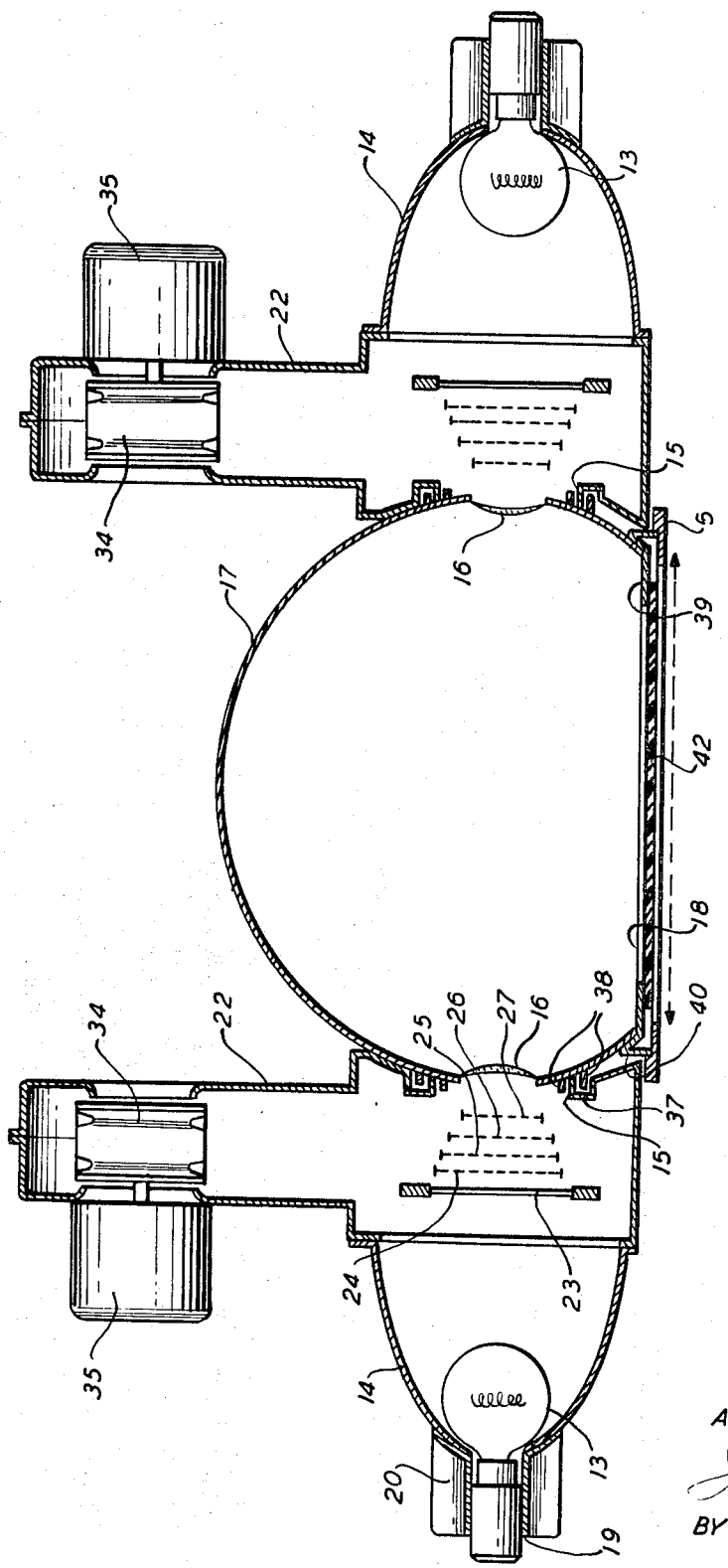

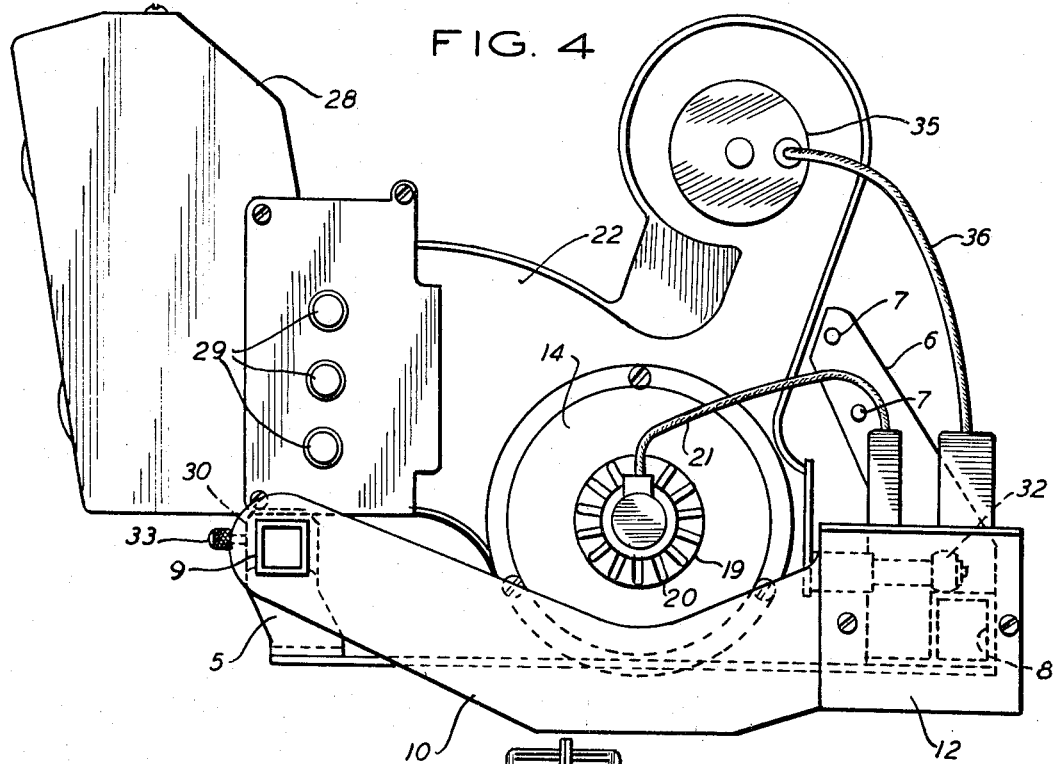
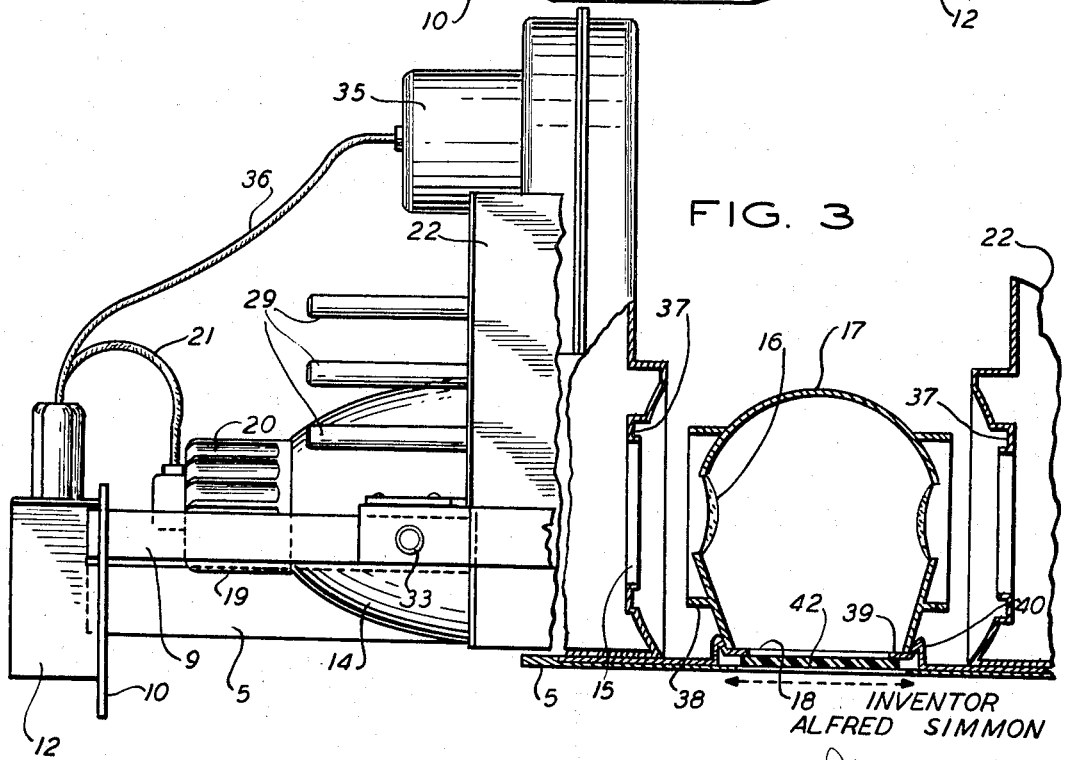

United States Patent Office 3,371,575
Patented Mar. 5, 1968

3,371,575
ILLUMINATING APPARATUS FOR PHOTOGRAPHIC ENLARGERS PROVIDED WITH INTERCHANGEABLE INTEGRATING BODIES
Alfred Simmon, New York, N.Y., assignor to Simmon Brothers, Inc., Woodside, N.Y., a corporation of New York
Filed Apr. 12, 1965, Ser. No. 447,326
8 Claims. (Cl. 88—24)

The present invention relates to illuminating apparatus for the copying or enlarging of photographic negatives or transparencies, and especially where diffused light is used, and constitutes an improvement over such apparatus as shown and described in my prior U.S. Patent No. 3,028,483, granted Apr. 2, 1962, and assigned to the same assignee as the present invention.

In such apparatus as shown and described in my previous patent the negative or transparency receives light from the relatively large exit window of a hollow spherical integrating body provided with a diffusely reflecting interior surface which is usually white. This integrating body receives light through one or more relatively small entrance windows from a lamp placed at one focal point of an elliptical light collector, preferably in the form of a surface of revolution of elliptical cross-section and having a specularly reflecting interior surface, while the other focal point of such light collector coincides with the entrance window of the spherical integrating body. Also, as is customary adjustable color filters are utilized to produce desired color blending when a color print is to be made from a color transparency and the usual infra-red and ultra-violet absorbing filter is present for eliminating such radiations passing to the film transparency.

The light flux thus entering the integrating body through the entrance windows finally emerges with relatively small losses through the exit window, with the luminous energy at the same time being fairly uniformly distributed over the area of the exit window and hence over the area of the film negative or transparency which is placed in proximity to such exit window. It accordingly follows that whether the same light flux enters a large integrating body with a large exit window or a small integrating body with a correspondingly small exit window, the light flux leaving the exit window will in either case have about the same total energy. However, in the case of the smaller exit window such light flux is distributed over a smaller area thus resulting in much higher energy per unit area. I have accordingly found that this phenomenon can be utilized to shorten the required exposure times for small transparencies which require high degrees of magnification and which heretofore have necessitated unduly long exposure times.

It is accordingly the object of the present invention to provide an illuminating apparatus for photographic printers and enlargers wherein the integrating bodies for mixing and integrating the light emerging through the exit window thereof may be readily interchanged so as to produce values of light energy per unit area in accordance with the size of the transparencies to be printed or enlarged and to simultaneously shorten the exposure time from that previously required.

Another object of the present invention is the provision of an illuminating apparatus for photographic printers and enlargers wherein the integrating bodies for mixing and integrating the light emerging through the exit window thereof are readily interchangeable, so that such integrating bodies have a definite relationship with respect to the size of the transparency to be printed or enlarged and the exposure time heretofore required for small transparencies necessitating higher magnification is significantly reduced by increasing the light energy per unit area falling upon the transparency.

The foregoing objects together with others which will become apparent to those skilled in the art as the following description proceeds are achieved in accordance with the present invention by the provision of an illuminating apparatus for photographic printers and enlargers wherein a spherical integrating body provided with a diffusely reflecting interior surface is utilized which has a light exit window corresponding to the size of the film transparency to be printed or enlarged and wherein such spherical integrating body has a diameter having a definite relationship with respect to the size of the transparency. Each such spherical integrating body for a given size transparency is interchangeable, with the respective elliptical light collectors being movable into and out of light-tight engagement with the spherical integrating body, regardless of the particular size of the latter used at any given time. This accordingly enables large integrating bodies with large exit windows to be utilized, which furnish relatively low light energy per unit area but entirely adequate for the relatively low magnifications required, and small integrating bodies to be employed with small exit windows giving rise to higher values of light energy per unit area for higher magnifications thus resulting in much shorter exposure times than heretofore obtainable for small transparencies.

The present invention may be more fully appreciated by reference to the accompanying drawings wherein:

FIG. 2 is a sectional view taken through a vertical plane passing through the center of the apparatus as shown in FIG. 1.

FIG. 3 is a fragmentary view partly in cross-section and somewhat similar to that of FIG. 2 except that it illustrates a small size integrating body, and FIG. 4 is a side view of the illuminating apparatus of the present invention looking from left to right in FIG. 1 but with no integrating body in place.

Figure 1:
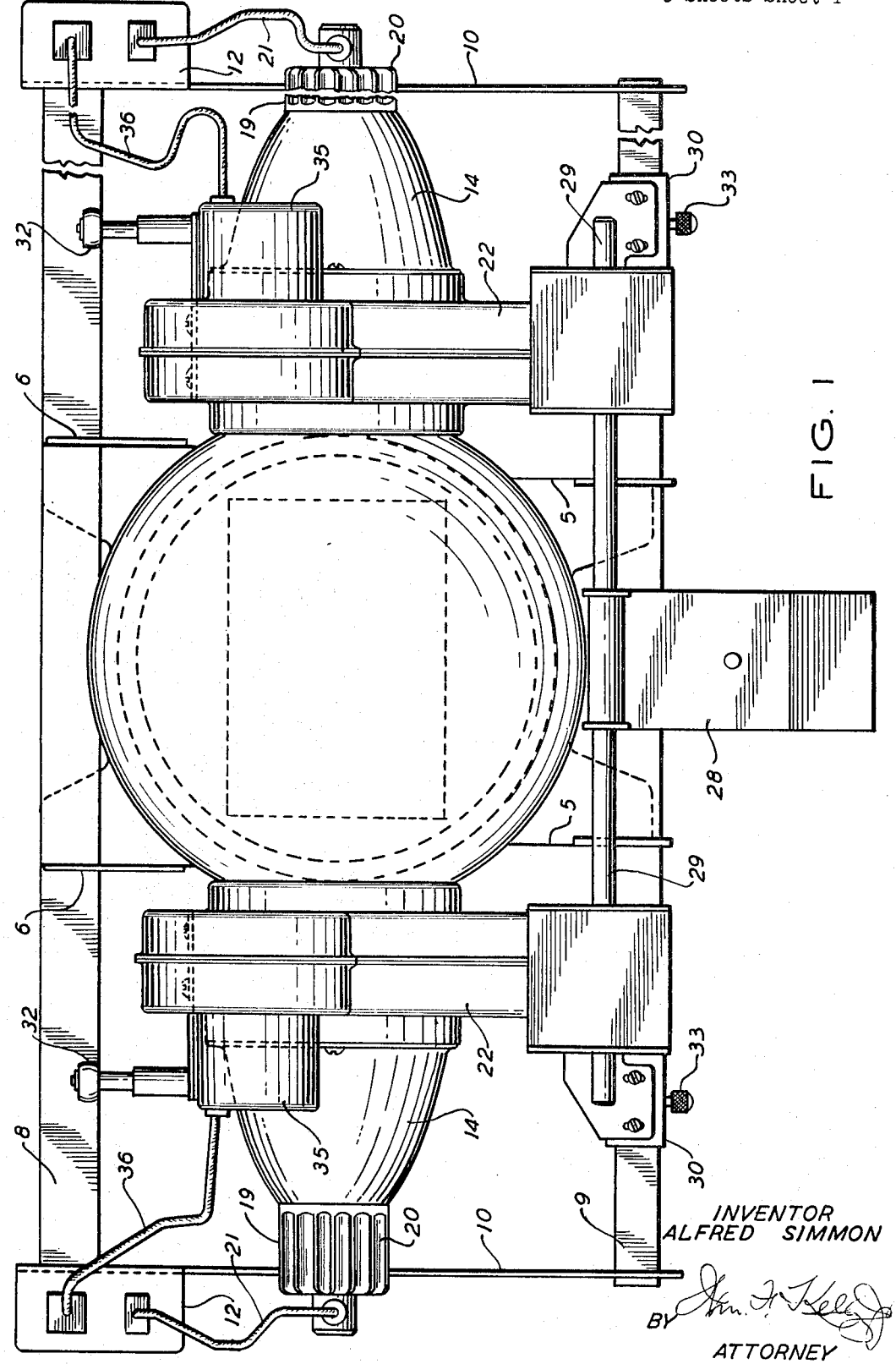
FIGURE 1 is a top plan view of the illuminating apparatus of the present invention and showing a large integrating body.

Referring now to the drawings in detail it will be noted that the illuminating apparatus as therein shown is basically formed of four subassemblies comprising a chassis, lamp and reflector assemblies, filter units, and the integrating bodies. Although two lamp and reflector assemblies along with two filter units are shown in the present embodiment it should be apparent that such apparatus will also operate satisfactorily with only a single lamp and reflector assembly and a single filter unit, or more than two of both such subassemblies.

The chassis consists of a base 5 provided with two upwardly extending arms 6 which may be provided with tapped openings 7 (FIG. 4) for the purpose of securing the chassis to a suitable supporting structure which also carries the usual negative support, lens, focusing device, and bellows, etc. such as that shown for example in my prior Patents 2,469,009 and 2,813,454 and assigned to the same assignee as the present invention. The chassis base 5 also carries two parallel members in the form of square tubing and constituting tracks 8 and 9 upon which the two lamp and reflector assemblies with their associated filter units, are slidably mounted. The outer ends of these tracks 8 and 9 are connected by cross-braces 10 which also support junction boxes 12 for the various electrical connections.

Each of the lamp and reflector assemblies is produced in accordance with the teachings of my aforesaid Patent No. 3,028,483 and comprises a lamp 13 with a concentrated filament disposed substantially at one focal point of an elliptical surface of revolution in the form of a reflector 14 and with the other focal point of such reflector coinciding substantially with an aperture 15 which aligns with the entrance window 16 of a spherical integrating body 17 also provided with an exit window 18. The socket for the lamp 13 is concentrically disposed within a radiator 19 provided with cooling fins 20 and is connected by a cable 21 to a suitable source of electrical supply by way of the junction box 12.

The filter units shown in the drawings likewise are substantially identical to that described in my aforesaid patent and hence have been herein shown more or less schematically. It should accordingly suffice to say that such filter units are not required where only a black and white print is desired but are of course essential for color printing. Such filters are disposed in a housing 22 to which the open end of the reflector 14 is secured and comprise a stationary disc 23 of infra-red radiation absorbing glass in the path of the concentrated light beam from the reflector 14 and backed up by a disc of ultra-violet radiation absorbing glass 24. The color filters of cyan 25, a yellow filter 26, and a magenta filter 27, are positioned between the ultra-violet absorbing filter 24 and the entrance window 16 of the integrating body 17. Such color filters are adjustable by mechanism (not shown) contained in a control box 28 with motion being transmitted from such mechanism to the adjustable color filters by three grooved shafts 29.

The entire filter unit together with the attached lamp and reflector assembly, as heretofore mentioned, are slidably mounted upon the tracks 8 and 9 by means of an inverted U-shaped bracket 30 movable over the track 9 and a roller 32 riding over the track 8 with both the brackets 30 and rollers 32 being carried by the filter housing 22, as seen more clearly in FIG. 1. The subassemblies are suitably locked in a desired position by means of knurled headed setscrews 33 passing through tapped openings in the brackets 30 and engaging the track 9. All filters, and particularly the infra-red absorbing filter 23, are cooled by small centrifugal blowers or the like 34 driven by small motors 35 which receive electrical energy through conductors 36 also extending from the junction boxes 12. It will also be noted, particularly from FIG. 2, that the housing 22 together with the integrating body 17 adjacent their juncture with each other are provided with concentric grooves 37 and ridges 38 which interlock with each other to form detachable light locks about the entrance window 16.

The integrating body 17 has been referred to herein as "spherical" but it is well known in the art that departures from a strictly spherical configuration are conceivable without destroying the effectiveness of the integrating body and for certain reasons such a departure can be advantageous. The essential criterion of all integrating bodies is that they be hollow bodies having a diffusely reflecting (non-glossy) interior surface which is generally white although they may be colored if desired for sensitized materials requiring light predominately of some particular color. In either event, however, the light entering the entrance window 16 of the integrating body 17 is repeatedly subjected to diffuse reflection by the walls of the hollow body and then passes through the exit window 18 in a substantially evenly distributed light flux.

Recognizing this phenomenon, the modification of the present invention as shown more particularly in FIG. 1 utilizes a large integrating body 17, which because of its size of approximately fifteen inches in diameter making it more suitable for transparencies up to 8 inches by 10 inches, more closely approaches that of a true spherical body. Accordingly, when a print is desired from a negative as large as 8 inches x 10 inches, the joined filter housing and attached lamp and reflector subassemblies are moved apart by oppositely sliding them along the tracks 8 and 9 and the large fifteen inch diameter integrating sphere dropped into place. By reference now more specifically to FIG. 2, it will be noted that such integrating body 17 rests upon a bottom plate 39 in turn carried by the chassis base 5 and with such bottom plate 39 having a circular ridge 40 mating with the integrating body 17 to form a light tight connection therebetween.

The bottom plate 39 is also provided with a rectangular opening and has a matte white finish on its upper surface while the under surface thereof has a sheet of opalized plastic or glass 42 secured thereto thus optically making such matte white surface and hence the bottom plate 39 a part of the integrating body 17, with its closed opalized rectangular opening actually constituting the exit window 18. When the integrating body 17 is thus placed in position resting upon the bottom plate 39, and forming a light-tight connection therewith, the operator then moves the filter and attached lamp and reflector subassemblies along the tracks 8 and 9 toward the integrating body 17, until the circular ridges 38 pass completely the depth of the concentric grooves 37 thus forming a light-tight juncture therebetween. The set-screws 33 are then tightened which thus holds all the subassemblies in place with the entire apparatus then conditioned for the making of desired prints from an 8 inch by 10 inch transparency.

Assuming now that the operator wishes to make prints from exceptionally small negatives such as 2¼ inches by 2¼ inches he will then loosen the set-screws 33 and again move the two filter units and their associated lamp and reflector assembly away from the integrating body 17 and then remove the latter along with its bottom plate 39 from the apparatus. Thereupon a new bottom plate having a small rectangular opalized opening with a diagonal of 3.2 inches is placed on the chassis base 5 after which a small integrating body of approximately four and one-half inches diameter is placed in light-tight manner on such bottom plate 39, as shown in FIG. 3. Again the two filter units and associated lamp and reflector assemblies are moved along the tracks 8 and 9 toward this small integrating body 17 until its circular ridges 38 merge with the concentric grooves 37 to form a light-tight union therebetween. The set-screws 33 are again tightened to thus lock the subassemblies in place and the apparatus is then ready for the making of prints from the 2¼ inch by 2¼ inch negative. Due to the greater value per unit area of the light flux now passing through the exit window 18 upon the adjacent small negative such prints can be made in much shorter exposure times than heretofore possible.

Although perhaps the largest size integrating body along with an exceptioinally small size integrating body have been herein shown and described, it should be apparent that intermediate size bodies can be just as readily utilized for negatives of intermediate size. This can be appreciated by the following table giving dimensions in inches together with the ratio of diagonal measurement of exit opening to the diameter of the integrating body (greatest diameter of sphere):

| Negative Size (in.) | Diameter of Body (in.) | Diagonal of Exit (in.) | Ratio of diagonal to diameter |
|---|---|---|---|
| 8 x 10 | 15 | 13 | .82 |
| 5 x 7 | 11 | 8.6 | .79 |
| 4 x 5 | 8 | 6.5 | .82 |
| 2¼ x 2¼ | 4½ | 3.2 | .70 |
| 1 x 1½ | 3 | 1.8 | .60 |

Thus the apparatus of the present invention is adjustable so as to utilize integrating bodies having a diameter best suited for the particular size negative. Although such bodies accordingly deviate in many instances from a strictly spherical body so far as actual contour is concerned, they all nevertheless maintain a uniform dimension from a center line taken through the light sources 13 and the axially disposed entrance windows 16 to the surface of the normally disposed exit opening 18. By maintaining the uniformity of this dimension and employing an integrating body 17 having its greatest diameter of the size as given in the above table, the diffusely reflected light flux impinging upon the film negative increases per unit area to such an extent as to make it possible to produce small prints in considerably less time than heretofore attainable thus resulting in much more efficient and economical operation of the entire apparatus.

It should accordingly be understood that although several embodiments of the present invention have been herein shown and described still further modifications thereof may be made without departing from the spirit and scope of the appended claims.

I claim:

1. An illuminating apparatus for photographic enlargers comprising a light source, a light collector, a number of light integrating bodies of different dimensions, and an apertured stage adapted to support a negative or transparency, said light collector including a reflector formed by a substantially elliptical surface of revolution having a specularly reflecting interior surface, said elliptical surface of revolution having two focal points, said light source positioned substantially at one of said focal points, each of said integrating bodies being hollow of substantially spherical shape with a matte diffusely reflecting substantially white interior surface, each integrating body including means defining a relatively large aperture and a relatively small aperture, means positioning any one of said integrating bodies in close proximity to said negative stage with said large aperture in juxtaposition and in alignment with the aperture of said negative stage, and means to adjust the position of said light collector with respect to the position of said integrating body whereby the second focal point of said elliptical surface of revolution is substantially within the area of said relatively small aperture.

2. A device according to claim 1 in which the large apertures of each of said substantially spherical integrating bodies are at least as large as the largest negative or transparency to be illuminated by said particular integrating body, and the diameters of said bodies are between one and two times as large as the diagonal of said largest negative.

3. A device according to claim 1 in which light modifying filters are included positioned between the two focal points of said elliptical surface of revolution.

4. A device according to claim 1 in which the ratio of the diagonal of said large aperture to the diameter of its integrating body for each of said integrating bodies is less than unity.

5. A device according to claim 1 in which said means to adjust the position of said light collector with respect to the position of said integrating body includes abutment means on said light collector engaging abutment means on said integrating bodies.

6. A device according to claim 1 in which a plurality of light collectors and light sources are provided, and each integrating body is provided with means defining a small aperture for each light collector.

7. A device according to claim 1 in which two oppositely positioned light collectors each with light sources are provided, and means is provided for the movement of said light collectors towards and away from said integrating body, each of said integrating bodies including means defining two small apertures for said two light collectors, said small apertures arranged on opposite portions of said integrating bodies and in planes which are parallel to each other and perpendicular to the plane of said large aperture, whereby said two light collectors when moved against said integrating body cause said second focal points to be positioned substantially within the area of said two small apertures.

8. An illuminating apparatus for photographic printers and enlargers adapted to illuminate different size negatives or transparencies and including interchangeable integrating bodies each of which has a preselected size having a definite ratio relative to the size of said film negative or transparency to be printed at any given time comprising:

(a) a chassis engageable with a support and provided with a pair of longitudinally extending tracks;

(b) a plurality of lamp and reflector subassemblies each comprising a hollow elliptical surface of revolution which forms a reflector, and a source of light disposed at one focal point of said reflector;

(c) a filter unit comprising a housing connected in light-tight manner to each said lamp and reflector subassemblies to form integral assemblies and having an outlet orifice disposed substantially at the other focal point of said reflector;

(d) a plurality of substantially spherical integrating bodies each with a diffusely reflecting interior surface and provided with an entrance window and an exit window, said integrating bodies having a maximum diameter varying from about fifteen inches to three inches with the diagonal measurement of the exit window thereof having a definite ratio relative to the film negative or transparency to be printed and such exit window diagonal varying from about thirteen inches to one and eight-tenths inches, and any preselected one of said integrating bodies adapted to be placed on said chassis to dispose its exit window adjacent a film transparency to be printed of substantially the same size as the exit window of the particular preselected integrating body;

(e) guides carried by the filter housing of each integral assembly and engaging the longitudinal tracks of said chassis for moving said integral assemblies in opposite directions relative to each other to enable an integrating body of preselected diameter and exit window diagonal to be placed on said chassis and said integral assemblies to be thereafter moved toward each other into light-tight locking engagement with said spherical integrating body to dispose the entrance windows of said body substantially at the other focal point of the reflector of each lamp and reflector subassembly, to cause the value per unit area of the light flux passing through the exit window of said integrating body to the adjacent film transparency to increase proportionally with a decrease in the size of the integrating body selected thereby enabling small size prints to be made with shorter exposure times than previously feasible; and (f) locking means operable to secure said integral assemblies and said spherical integrating body in fixed position on said chassis.

References Cited

UNITED STATES PATENTS 3,069,971  12/1962  Simmon et al. _____ 88—24

NORTON ANSHER, *Primary Examiner.*

R. A. WINTERCORN, *Assistant Examiner.*